(12) United States Patent
Shin

(10) Patent No.: US 9,848,023 B2
(45) Date of Patent: Dec. 19, 2017

(54) ELECTRONIC DEVICE AND METHOD FOR TRANSMITTING DATA BY USING MESSENGER APPLICATION

(71) Applicant: Samsung Electronics Co., Ltd., Gyeonggi-do (KR)

(72) Inventor: Jae-Yeoung Shin, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 442 days.

(21) Appl. No.: 14/314,872

(22) Filed: Jun. 25, 2014

(65) Prior Publication Data

US 2015/0006653 A1   Jan. 1, 2015

(30) Foreign Application Priority Data

Jun. 26, 2013 (KR) .................. 10-2013-0073618

(51) Int. Cl.
H04L 29/06 (2006.01)
H04L 12/58 (2006.01)

(52) U.S. Cl.
CPC .......... *H04L 65/403* (2013.01); *H04L 51/046* (2013.01); *H04L 51/08* (2013.01)

(58) Field of Classification Search
CPC ...... H04L 65/403; H04L 51/046; H04L 51/08
See application file for complete search history.

(56) References Cited

U.S. PATENT DOCUMENTS

| 7,133,900 B1 * | 11/2006 | Szeto | H04L 51/04 709/203 |
| 8,819,154 B2 * | 8/2014 | Al-Asaaed | H04L 51/10 348/14.01 |
| 2003/0208543 A1 * | 11/2003 | Enete | H04L 12/1822 709/206 |
| 2004/0223606 A1 * | 11/2004 | Enete | H04L 12/581 370/352 |
| 2012/0190388 A1 * | 7/2012 | Castleman | H04L 12/581 455/466 |

FOREIGN PATENT DOCUMENTS

| CA | EP 2582120 A1 * | 4/2013 | ........ H04M 1/72555 |
| EP | 2 582 120 A1 | 4/2013 | |

* cited by examiner

*Primary Examiner* — Michael C Lai
(74) *Attorney, Agent, or Firm* — Cha & Reiter, LLC.

(57) ABSTRACT

A method is provided including: generating, by an electronic device, at least one content item executable on a first application; executing a second application while the first application is still active; and transmitting the content item to a server by using the second application.

14 Claims, 19 Drawing Sheets

ELECTRONIC DEVICE AND METHOD FOR TRANSMITTING DATA BY USING MESSENGER APPLICATION

PRIORITY

This application claims priority under 35 U.S.C. §119 to an application filed in the Korean Intellectual Property Office on Jun. 26, 2013 and assigned Serial No. 10-2013-0073618, the contents of which are incorporated herein by reference.

BACKGROUND

1. Field of the Disclosure

The present disclosure relates generally to electronic devices, and more particularly to an electronic device and method for transmitting data using a messenger application.

2. Description of the Related Art

Existing Short Message Service (SMS) and Multimedia Message Service (MMS) services that are provided by telecommunications providers are rapidly becoming displaced by a new generation of messaging applications. However, conventional electronic devices are sometimes limited in the types of data they may transmit via their messaging applications. For instance, some electronic devices may transmit only text data and images that are generated via their messenger applications. Therefore, the need exists for new techniques for transmitting data.

SUMMARY

The present disclosure addresses this need. According to one aspect of the disclosure, a method is provided comprising: generating, by an electronic device, at least one content item executable on a first application; executing a second application while the first application is still active; and transmitting the content item to a server by using the second application.

According to another aspect of the disclosure, a method is provided comprising: receiving a content item and a schema associated with the content item, the content item being received via a second application; displaying, in the second application, an indication that the content item is received, the indication being displayed based on the schema; identifying a first application that is capable of opening the content item based on the schema; and executing the first application and opening the content item with the first application.

According to yet another aspect of the disclosure, an electronic device comprising a communication module and a processor configured to: generate at least one content item by executing a first application; execute a second application while the first application is still active; and transmit the content item and a schema associated with the content item to a server by using the second application.

According to yet another aspect of the disclosure, an electronic device is provided comprising a display unit and a processor configured to: receive a content item and a schema associated with the content item, the content item being received via a second application; display, in the second application, an indication that the content item is received, the indication being displayed based on the schema; identify a first application that is capable of opening the content item based on the schema; and execute the first application to open the content item with the first application.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION

Hereinafter, aspects of the present disclosure will be described more specifically with reference to the accompanying drawings. In the following description, detailed descriptions of well-known functions or constructions will be omitted since they could obscure the disclosure in unnecessary detail. Also, the terms used herein should be interpreted in the context of the specification.

Figure 1:
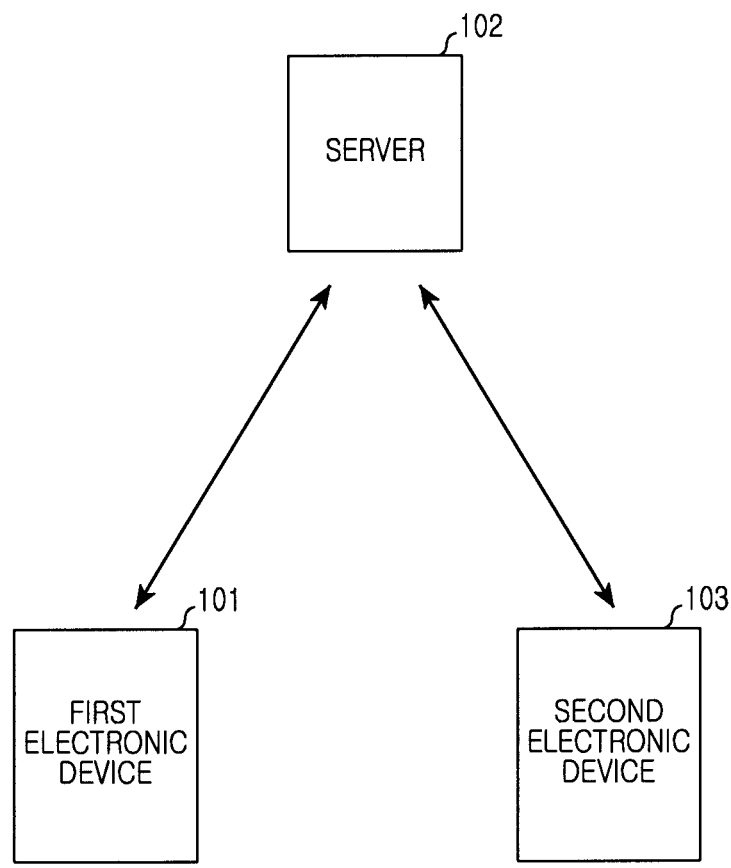
FIG. 1 is a diagram of an example of a system, according to aspects of the disclosure.

FIG. 1 is a diagram of an example of a system, according to aspects of the disclosure. As illustrated, the system includes a first electronic device 101, a server 102, and a second electronic device 103.

The first electronic device 101 may transmit at least one content item generated by a first application executed on the first electronic device 101 to the server 102. The content item may be transmitted to the server by a second application executed on the first electronic device 101. Afterwards, the content item may be transmitted, via the server 102, to the second electronic device 103.

In some aspects, the first application and the second application may be applications installed or installable on both the first electronic device 101 and the second electronic device 103. The first application may be any suitable software application capable of generating content, and the second application may be a messenger application. More specifically, in order for the second electronic device 103 to receive at least one content item transmitted from the electronic device 101 through the server 102, the second application, e.g., a messenger application, needs to be installed on the second electronic device 103, as well. In addition, the first application need also be installed on the second electronic device 103 in order for the second electronic device to be able to view/edit the content item transmitted from the first electronic device.

In operation, the first electronic device 101 may generate at least one content item by executing the first application. The first electronic device 101 may then execute the first software application to store the at least one content item in memory. The first application, for example, may be a musical composition application. The first electronic device 101 may use the first application to generate note sheets by executing the first application and then store the generated note sheets in memory.

Although in the present example note sheets are being transmitted, in other examples any suitable type of content item may be transmitted from the first electronic device to the second electronic device. For example, the transmitted content item may include at least one of text, sound, image, or video. In some implementations, the transmitted content item may be opened or executed only by instances of the first application.

The first electronic device 101 may select any number of content items generated by the first application. For example, if the first application installed on the first electronic device 101 generates a first content item, a second content item, and third content item, a list identifying the three content items may be displayed on the touch screen of the first electronic device 101. In some implementations, the list may be generated by the first application. The first electronic device 101 may then receive, via the list, a selection of one or more of the content items.

Next, the first electronic device 101 may generate a data structure that encapsulates the selected one or more content items. In some implementations, the data structure may further include a schema including information about the selected one or more content items.

Then, while the first application is still running, the first electronic device 101 may execute the second application and use the second application to transmit the generated data structure to the server 102. In some instances, executing the second application may be needed because the first application may lack the capability to transmit content.

The server 102 may be any suitable type of electronic device that is capable receiving data from the first electronic device 101 and transmitting the received data to the second electronic device 103. In operation, the server 102 may receive the data structure encapsulating the least one content item from the first electronic device 101 and forward the data structure to the second electronic device 103.

The second electronic device 103 may include any suitable type of electronic device that is capable of receiving the data structure. More specifically, upon receiving the data structure, the second electronic device may process the data structure to identify content items that are encapsulated within. Next, the second electronic device may output an indication of one or more of the encapsulated content items. For example, if the second electronic device 103 receives three content items from the first electronic device 101 (via the server 102), the second electronic device 103 may display a list identifying the received three content items on the touch screen of the second electronic device 103.

Upon receiving a selection of at least one of the content items encapsulated inside the data structure, the second electronic device 103 may execute an instance of the first application in order to view and/or edit the selected at least one content item. In some instances, the selection may be received via the list. Then, the second electronic device 103 may edit the at least one content item by executing the first application. And finally, after the editing is completed, the second electronic device may encapsulate the edited content item into another data structure and forward the data structure to the server 102 for further transmission to the first electronic device 101.

Figure 2A:
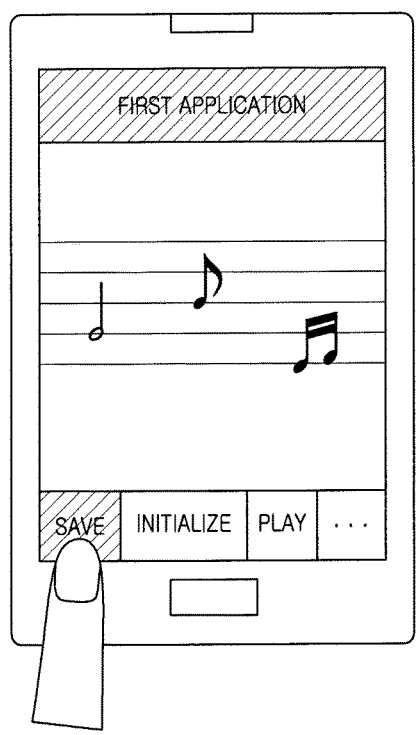
FIG. 2A, FIG. 2B, FIG. 2C, FIG. 2D, FIG. 2E and FIG. 2F are diagrams illustrating an example of a technique for transmitting at least one content item generated by a first application installed on a first electronic device to a server, through a second application, according to aspects of the present disclosure.

FIGS. 2A-F are diagrams illustrating an example of a technique for transmitting at least one content item generated by a first application installed on a first electronic device to a server through a second application, according to aspects of the present disclosure. For example, the first application installed on the first electronic device may be a musical composition application, and the second application may be a messenger application that is linked or otherwise associated with the first application. As shown in FIG. 2A, the first electronic device may generate at least one content item by using the first application. For example, as shown in FIG. 2A, the first electronic device may generate a sheet of musical notes.

Figure 2B:
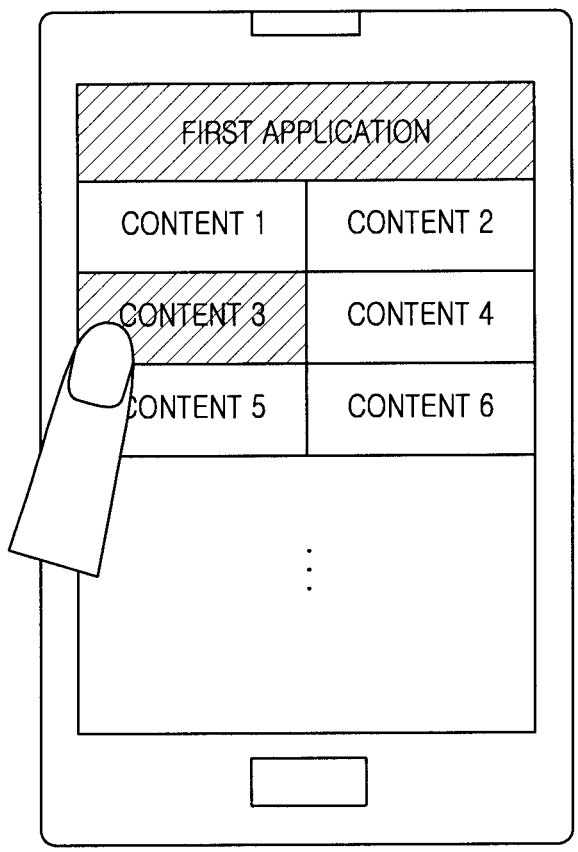

Next, as shown in FIG. 2B, the first electronic device display a list of content items generated by the first application. More specifically, after displaying the list, the first electronic device may receive a selection of one or more of the content items (e.g., note sheets) in the list. For example, as shown in FIG. 2B, six content items, (1 through 6) may be generated by the first application on the first electronic device. In some implementations, the list may be generated by the first application and/or by any other suitable component of the first electronic device. After displaying identifiers of the six content items generated by the first application on the touch screen of the first electronic device, the first electronic device may detect a selection of at least one of the content items (e.g., "content 3") from among the displayed six content items.

Figure 2C:
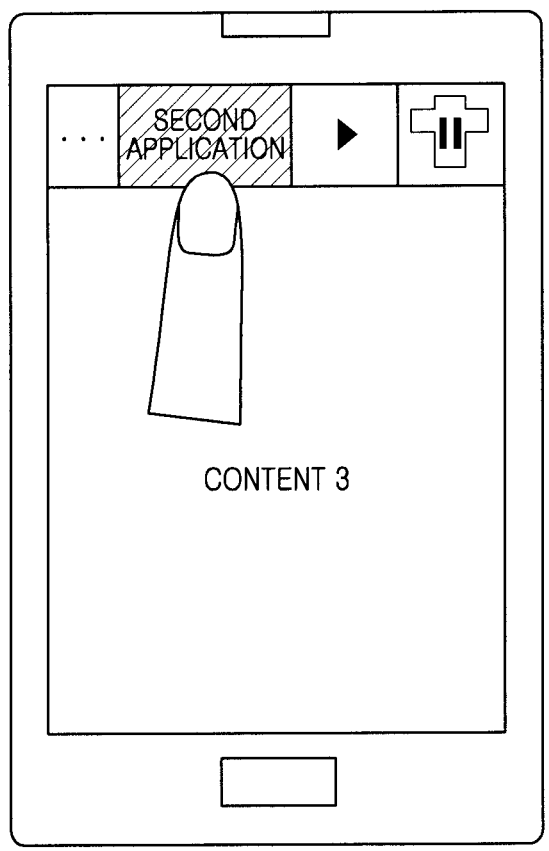

Next, as shown in FIG. 2C, the first electronic device 101 may display a menu for selecting an application for transmitting the selected content item with. In the example of FIG. 2C, the menu for selecting the application is depicted at the top of the screen of the first electronic device, but in other examples it can be displayed anywhere on the screen. The menu may be displayed concurrently or successively with the interface of the first application. After the menu is displayed, a selection of the second application from the menu is detected by the first electronic device 101. In some implementations, the menu may be generated by the second application and/or by any other suitable component of the first electronic device.

Figure 2D:
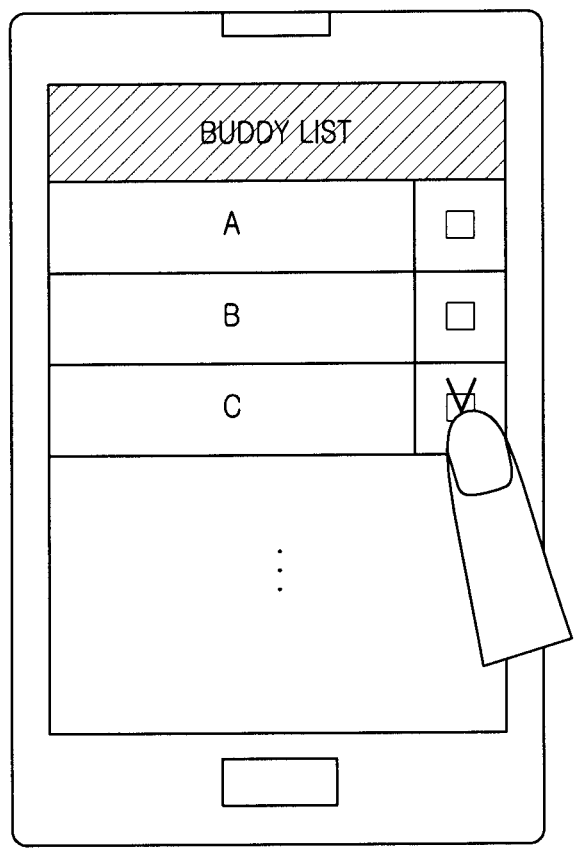
Figure 2E:
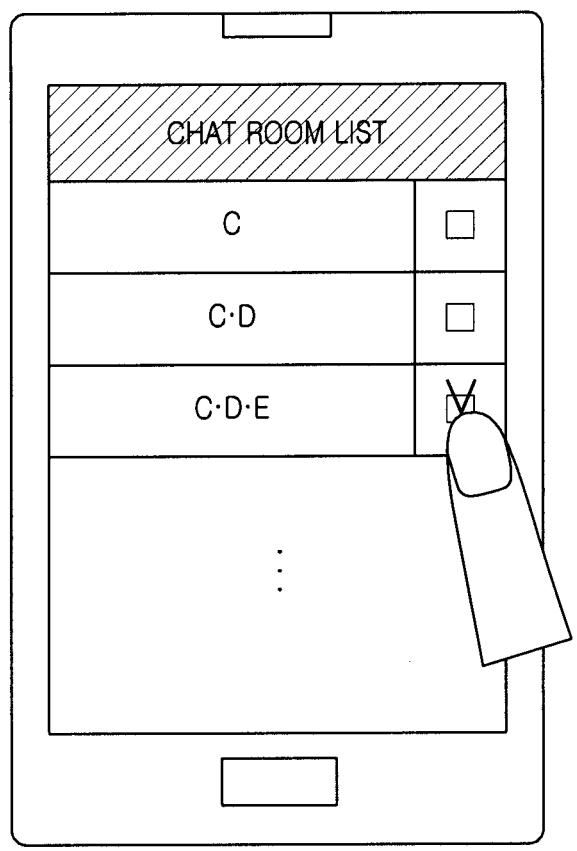
Figure 2F:
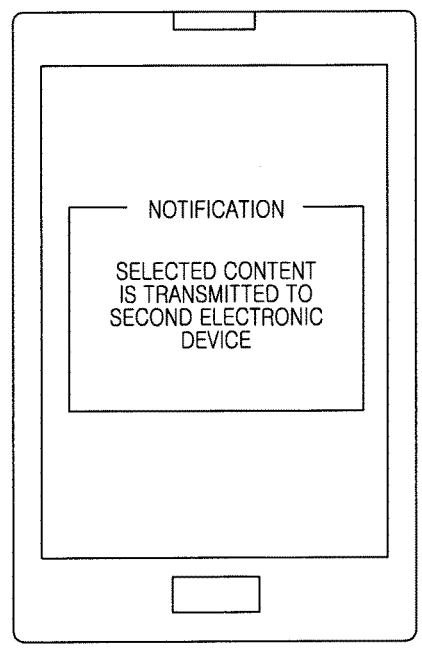

Next, as shown in FIGS. 2D-E, the first electronic device 101 may execute the second application. In some implementations, the second application may be executed while a window of the first application is still displayed on the screen of the first electronic device (e.g., while the first application is still active). In some implementations, executing the second application may result in displaying a buddy list of potential recipients (see FIG. 2D) and/or displaying a chat room list identifying one or more chat rooms to which the selected content may be transmitted (see FIG. 2E). Afterwards, the electronic device may detect a selection of a user and/or chat room to which the selected one or more content items are desired to be transmitted.

Finally, as shown in FIG. 2E, the electronic device may transmit the selected at least one content item to the server by using the second application installed on the first electronic device. The at least one content item may be transmitted to one or more users and/or one or more chat rooms that are specified via the menus depicted in FIGS. 2C-D.

After the at least one content item is transmitted, the electronic device may display a message indicating that the transmission was successful.

In some instances, as noted above, transmitting the selected content items may include generating a data structure encapsulating the selected content items. Additionally or alternatively, in some implementations, the data structure may include a schema including information about the selected content items, such as names of the content items, what application to open the content items with, etc. Additionally or alternatively, in some implementations, the schema may be part of a header of the data structure.

FIGS. 3A-F are diagrams illustrating an example of a technique for editing received content by executing a first application after receiving at least one content item from a server by using a second application installed on a second electronic device according to an aspect of the present disclosure. For example, the first application installed on the second electronic device may be a musical composition application, and the second application may be a messenger application that is linked or otherwise associated with the first application. In some aspects, the two applications may be considered to be linked when the second application is designated for use in sending content generated by the first application to the second electronic device.

Figure 3A:
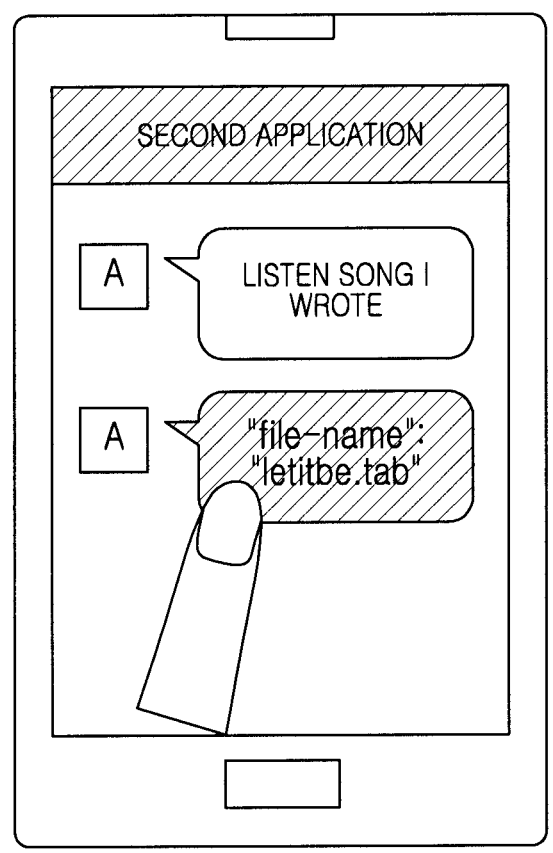
FIG. 3A, FIG. 3B, FIG. 3C, FIG. 3D, FIG. 3E and FIG. 3F are diagrams illustrating an example of a technique for editing received content, according to an aspect of the present disclosure.

As shown in FIG. 3A, the second electronic device may receive one or more content items that are transmitted by the first electronic device. Upon receiving the one or more content items, the second electronic device may output an indication indicating receipt of the content items as illustrated. In one example, the second electronic device may receive a data structure encapsulating a content item and a schema identifying the name of the content item. Upon receiving the data structure, the second electronic device may parse the data structure to identify information about the content item, generate a notification that the content item is received based on the information, and output the notification. As illustrated, the notification may include the name of the received content item—"let it be.tab". In some implementations the notification may be generated by the second application. Additionally or alternatively, in some implementations, the notification may be generated based on information contained in the schema. After the notification is generated and displayed, the second electronic device detects a selection of the notification.

Figure 3B:
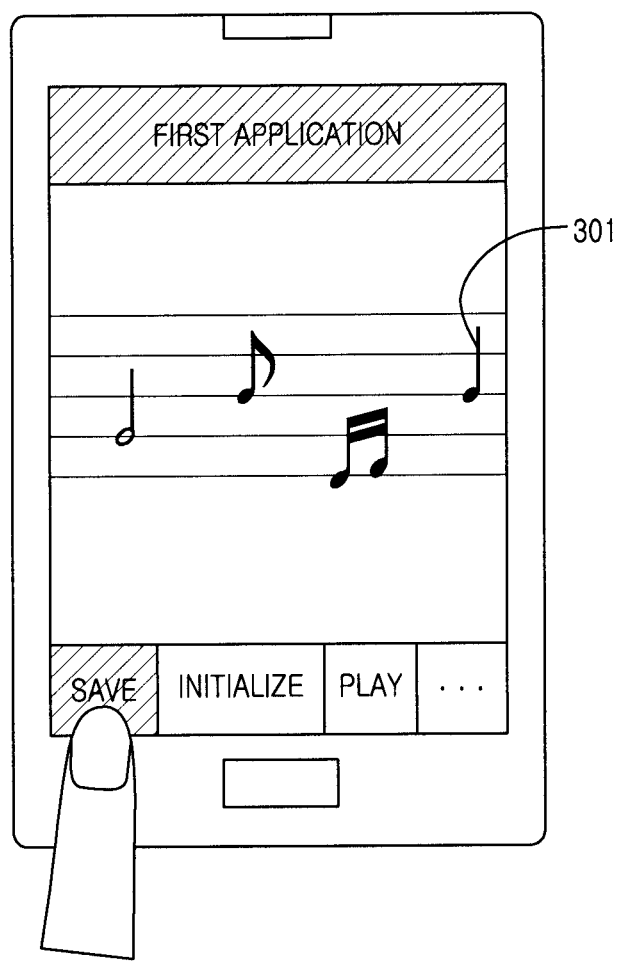

Next, as shown in FIG. 3B, the second electronic device may launch an instance of the first software application in response to the selection of the notification. After the first software application is launched, the second electronic device may use the first software application to edit the received content item. In particular, the second electronic device may add notes 301 to the content item. Afterwards, the second electronic device may detect an instruction to save the edits to the content item.

Figure 3C:
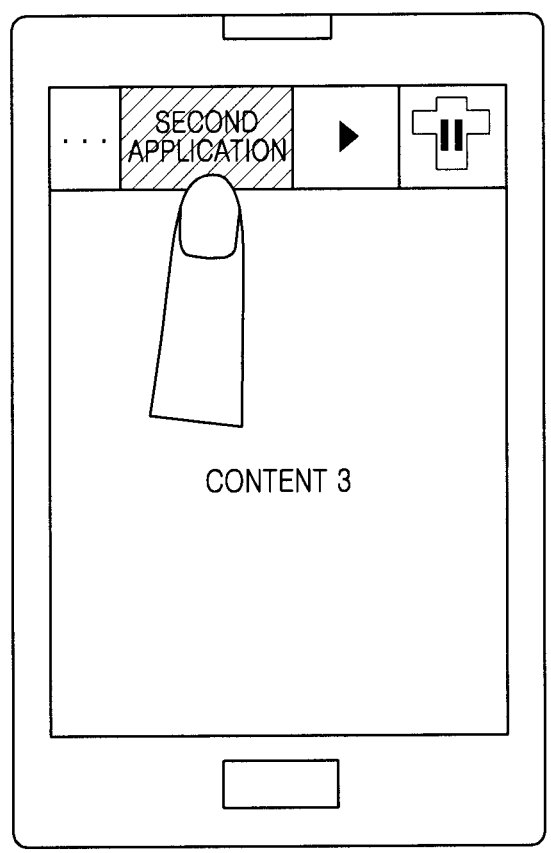

Next as shown in FIG. 3C, the second electronic device may display a menu for selecting a software application to send the edited content item with. In this example, the menu is displayed concurrently with a window of the first software application. Furthermore, in this example, the second software application is selected from the menu.

Figure 3D:
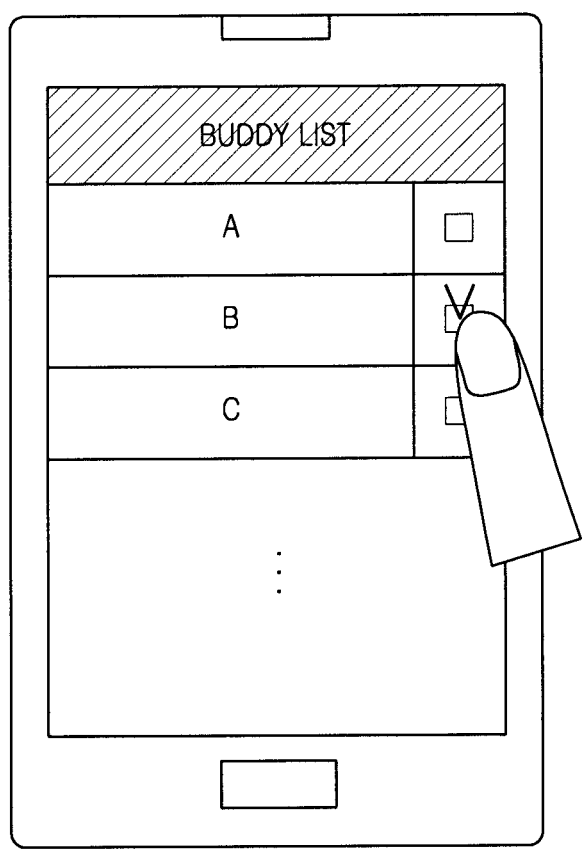
Figure 3E:
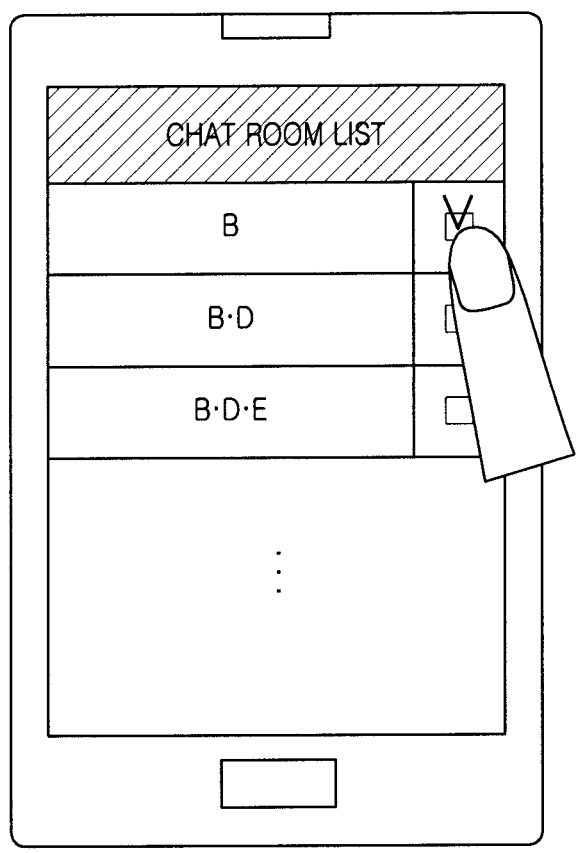
Figure 3F:
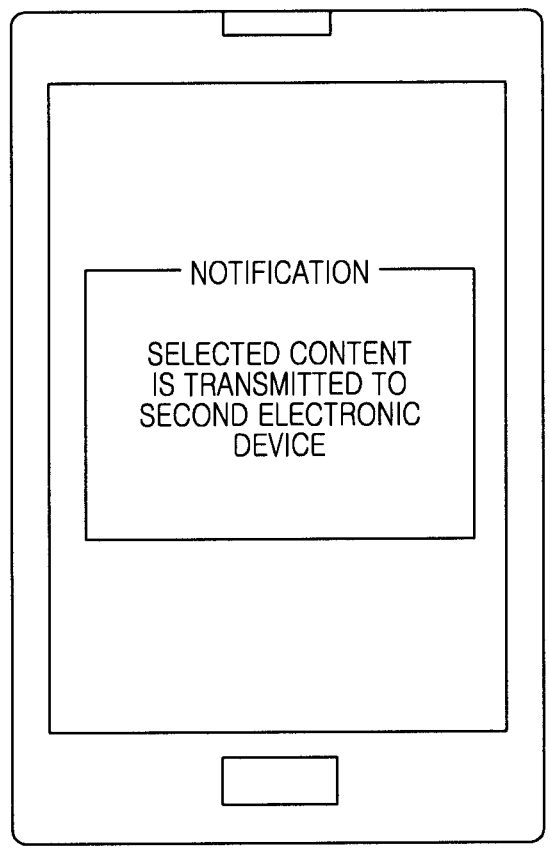

Next, as shown in FIGS. 3D-E the second electronic device may display one or more menus for selecting recipient(s) of the edited content item. As illustrated, the recipients may include (i) one or more chat rooms, (ii) one or more individual users, or (iii) any combination of (i) and (ii). Finally, as shown in FIG. 3F, the second electronic device may transmit the edited content item to the selected one or more recipients. In some implementations, transmitting the edited content item may include generating a data structure encapsulating the edited content item and transmitting the data structure to the selected recipients. Additionally or alternatively, in some implementations, the generated data structure may further include a schema identifying one or more characteristics of the content item.

Figure 4:
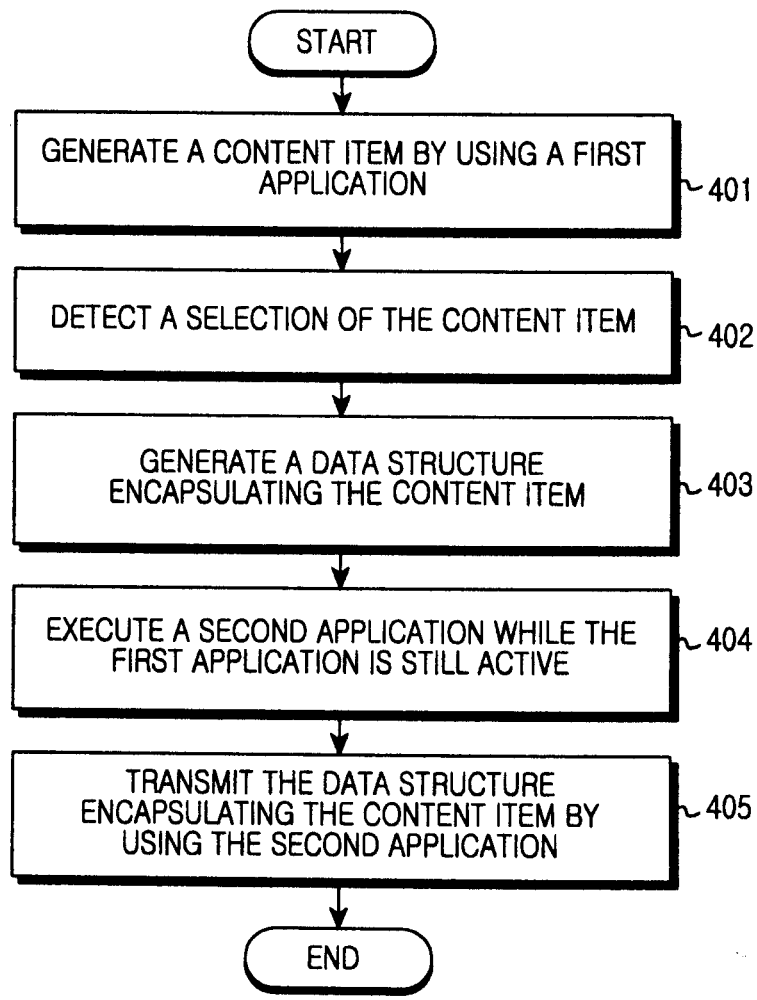
FIG. 4 is a flowchart of an example of a process, according to an aspect of the present disclosure.

FIG. 4 is a flowchart of an example of a process performed by the first electronic device according to an aspect of the present disclosure. First, as shown in FIG. 4, the first electronic device may generate at least one content item by using the first application (step 401). In some implementations, the at least one content item may be executable only on the first application. For example, the at least one content item generated by the first application may include at least one of text, sound, image, video, and/or any suitable content generated by the first application and executable only on the first application.

Next, the first electronic device may select the content item for transmission to another device (step 402). In some instances, the content item may be selected from a list identifying a plurality of content items that are editable using the first application. As noted above, the electronic device may display a buddy list and a chat room list identifying recipients to which the selected content item can be transmitted.

Next the first electronic device may generate a data structure encapsulating the selected content item (step 403). In some implementations, the data structure may further include a schema a further including information about the content item. Additionally or alternatively, in some implementations, the schema may be part of a header of the data structure.

Next, while the first application is still running, the first electronic device may execute the second application (step 404). More specifically, when receiving a selection of at least one content item displayed on the touch screen of the first electronic device, the first electronic device may maintain the first application in an active state and launch the second application to transmit the selected content to the second electronic device while the first application is still running Next, the first electronic device may transmit the data structure encapsulating the content item to the server by using the second application (step 405).

Figure 5:
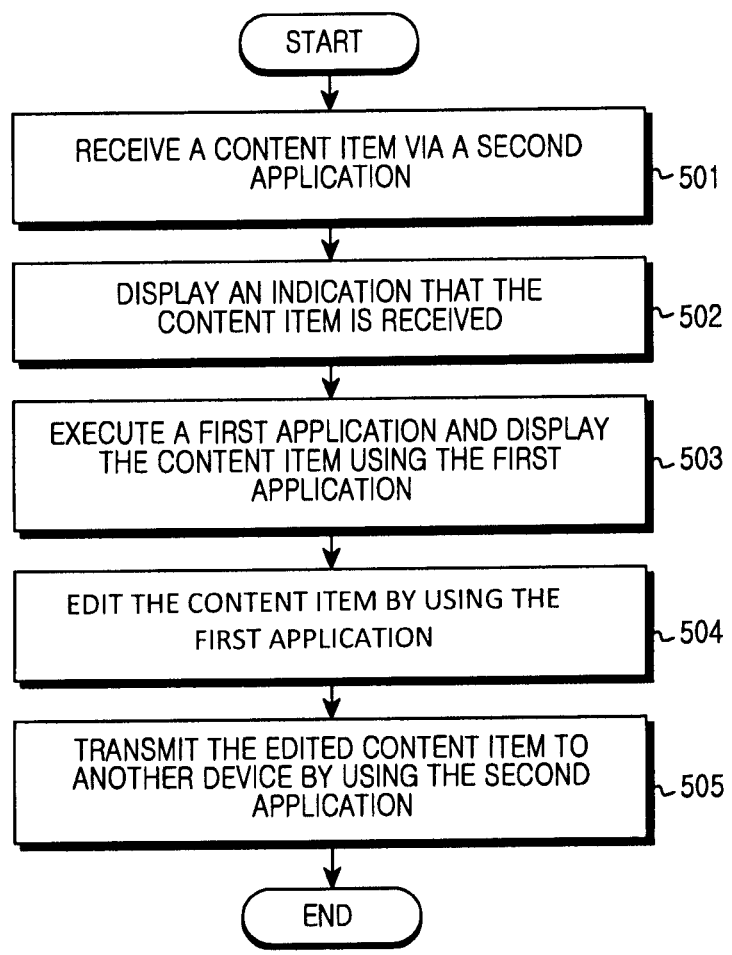
FIG. 5 is a flowchart of an example of another process according to aspects of the disclosure.

FIG. 5 is a flowchart of an example of another process according to aspects of the disclosure. First, as shown in FIG. 5, the second electronic device may receive a content item transmitted by the first electronic device by executing an instance of the second application (step 501). Next, the electronic device may display an indication that the content item is received (step 502). Next, the second electronic device may execute an instance of the first application and open the content item by using the first application (step 503). Next, the second electronic device may edit the content item by using the first application (step 504). Next, the second electronic device may detect a request to transmit the data back to the first device (or another device) and fulfill the detected request (step 505). More specifically, the second electronic device may execute the second application and use the second application to transmit the content item to the first electronic device. For example, the electronic device may detect a selection of a buddy and/or chat room that are to receive the content item, and may transmit the detected buddy and chat room information together to the server.

Figure 6:
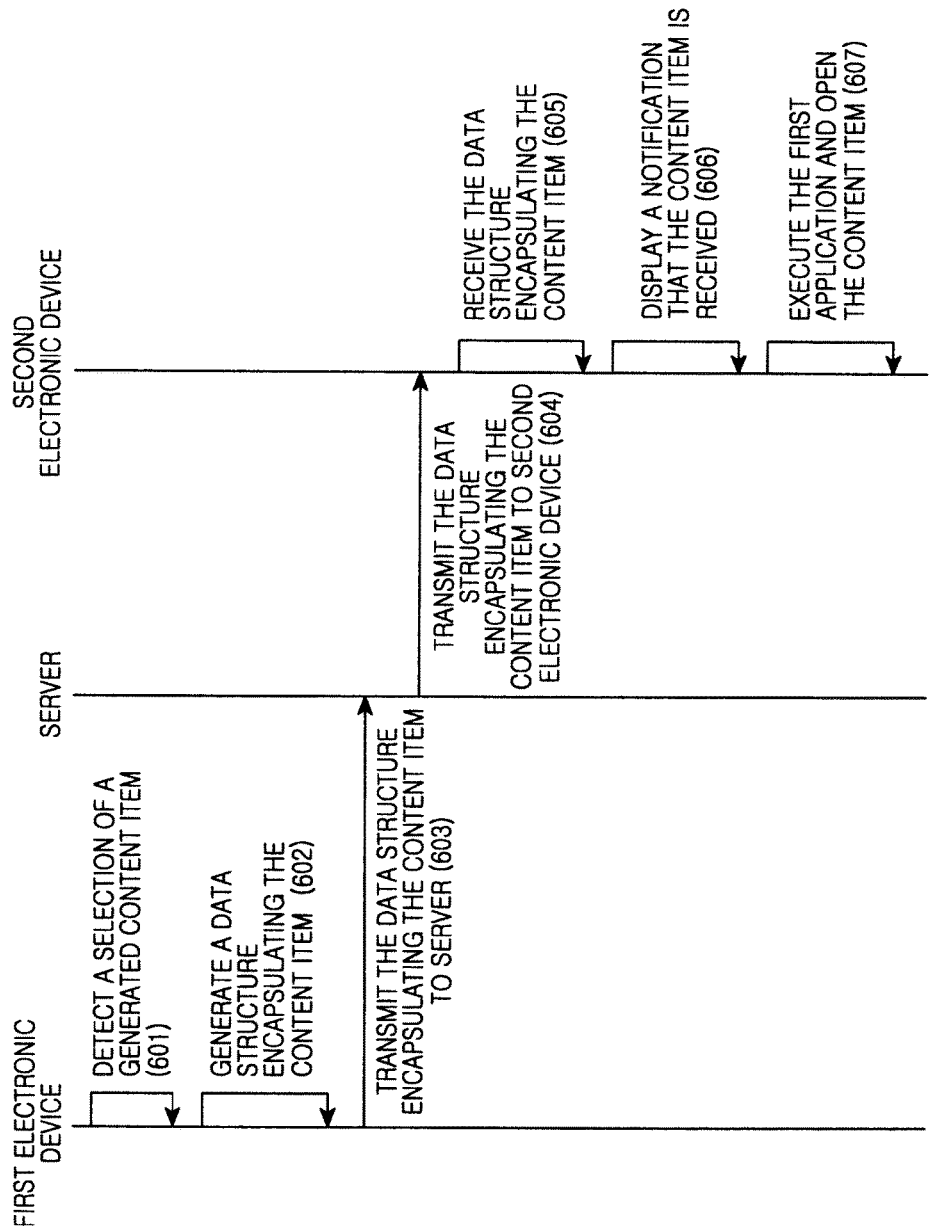
FIG. 6 is sequence diagram of an example of yet another process, according to aspects of the disclosure.

FIG. 6 is a sequence diagram of an example of yet another process, according to aspects of the disclosure. In step 601, the first electronic device may select at least one content item generated by the first application. More specifically, after displaying the content item generated from the first application on the touch screen of the first electronic device, the first electronic device may receive user input selecting the content item.

In step 602, in response to the selection of the content item, the first electronic device may generate a data structure encapsulating the content item. In some implementations, the data structure may further include a schema containing information about the content item. The schema may be formatted using Extensible Markup Language (XML) and/or any other suitable content.

In step 603, the first electronic device may transmit the content item to the server by using the second application. More specifically, the first electronic device may transmit the data structure encapsulating the content item.

In step 604, the server may transmit the data structure to the second electronic device in step 604.

In step 605, the second electronic device may receive the data structure encapsulating the content item by executing the second application. For example, upon receiving the data structure, the second electronic device may process the data structure to extract the following schema:

```
{
"type":"link",
"format":"json",
"push_message":{
    "type":"link","content_type":"app"
},
"content":{
    "type":"app",
    "message":{"type":"file","text":"Let it be Get popular music",
        "file":{
            "type":"tab",
"file_url":"http://kr.file.samsungchaton.com/1234.tab", "file_name":"letitbe.tab", "sender_uid": "qwjfsalkfjsafjklsajf"
        }
    },
    "appInfo":{
        "name":"Best guitar music application",
        "version":"1.0.0"
        "param":{
"id":"com.guitar.viewer","executeUri":"guitarviewer://com.guitar.viewer","OS":"android","installUrl":"market://details?id=com.guitar.viewer","deviceType":"phone"
        },
    }
}
}
```

As illustrated, in this example, the schema includes various tags. In particular, the tag "type" may identify the type of the content item. The tag "file name" may identify the name of a file constituting the content item that is encapsulated inside the data structure. The tag "name" may identify an application that is to be used for opening the file constituting the content item. And the tag "installUrl" may identify an address from which the application that is to be used for opening the file can be downloaded.

As noted above, in some instances, the schema may be generated by the first electronic device in response to receiving instructions to transmit the content item to the second electronic device. The schema may be used by the second electronic device as a basis for at least one of (1) displaying an indication that the content is received at the second electronic device and (2) rendering the content on the second electronic device (e.g., selecting a software application to render the content with).

For example, if an application such as the above "the best guitar music application" is not installed on the second electronic device, the second electronic device may extract from the schema a URL from where the application can be retrieved, such as "installUrl":"market://details?id=com.guitar.viewer. Afterwards, the second electronic device may retrieve the application by using the URL for subsequent use in executing (e.g., opening and/or editing the content).

In step 606, the second electronic device displays a notification that the content item has been received. In some implementations, the notification may be generated based on information that is contained in the schema. Thus, in some implementations the second electronic device may parse/process the data structure to extract various information and/or files contains within. For example, the second electronic device may extract from the data structure, the schema or portions thereof. As another example, the second electronic device may extract a file that is encapsulated in the data structure, such as a file that is executable (e.g., capable of being opened and/or edited) by the first application. In step 607, the second electronic device detects that the notification has been selected, launches a first application, and opens the received content item with the first application. In some implementations, the second application may launch the first application.

Figure 7:
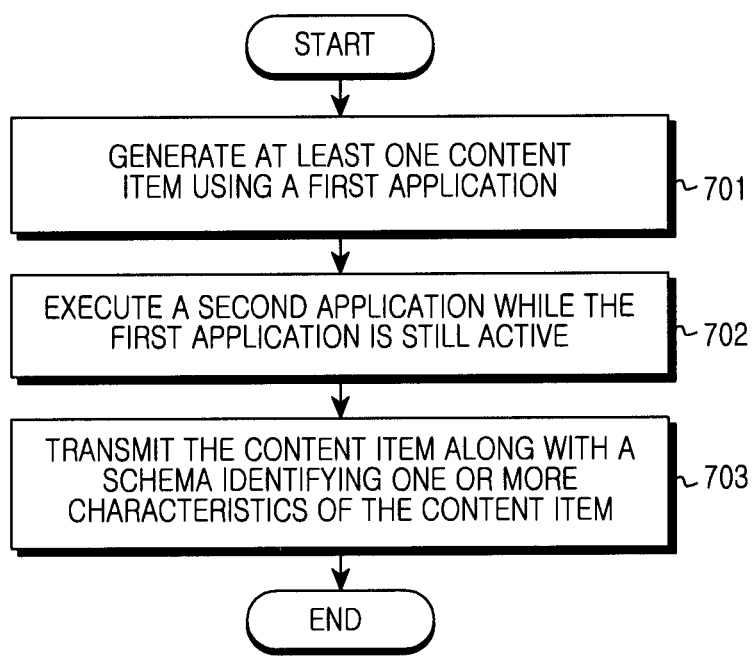
FIG. 7 is a flowchart of an example of yet another process in accordance with aspects of the disclosure.

FIG. 7 is a flowchart of an example of yet another process in accordance with aspects of the disclosure. In step 701, the first electronic device may generate a content item using a first application. Here, the content item may include at least one of text, sound, image, video, and content generated by the first application itself and executed only on the first application. In some instances, the generated content item may be one that is executable on the first application only.

In step 702, while the first application is still active, the first electronic device may execute the second application.

In step 703, the first electronic device may transmit the content item by using the second application. More specifically, in order to transmit the content item generated from the first electronic device to the second electronic device, the first electronic device may transmit a data structure encapsulating the content item to the server by using the second application, e.g., a messenger application installed on the first electronic device. As noted above, in some implementations, the data structure may include a schema identifying one or more characteristics of the content item. The data structure may be transmitted to the server.

Figure 8:
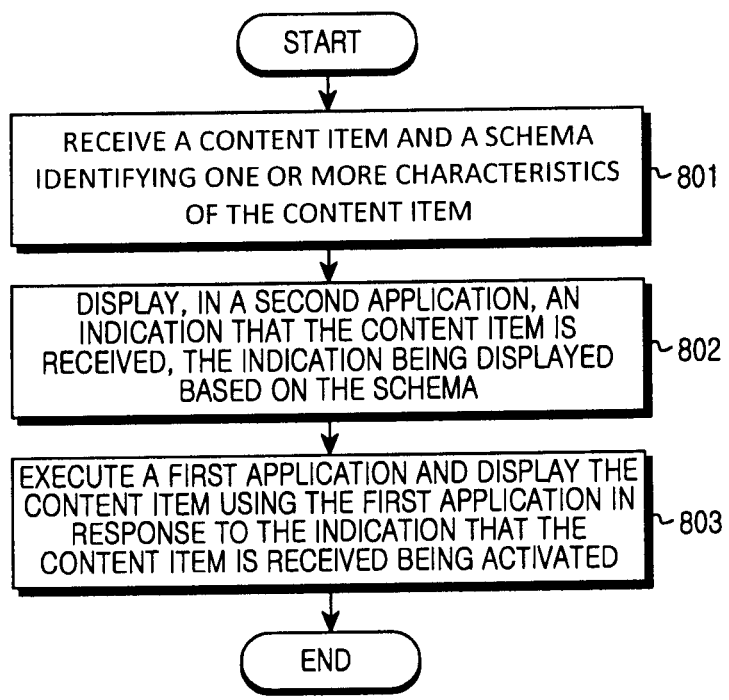
FIG. 8 is a flowchart of an example of yet another process, according to aspects of the disclosure.

FIG. 8 is a flowchart of an example of yet another process, according to aspects of the disclosure. In step 801, the second electronic device may process a data structure received from the server by executing the second application. As noted above, the data structure may be encapsulating a content item generated on the first electronic device. More specifically, the second electronic device may parse the data structure to extract a schema corresponding to the content item and a file constituting the content item (e.g. a .tab file).

In step 802, the second electronic device may display an indication that the content item is received based on the schema. More specifically, the second electronic device extract the schema from the data structure and generate a notification that the content item is received based on information that is contained in the schema. As indicated above, in some implementations, the content item and the schema may be encapsulated together in the same data structure when they are transmitted from the first electronic device to the second electronic device.

In step 803, the second electronic device may launch the first application and use the first application to execute (e.g., open and/or edit) the content item. In some implementations, the first application may be executed in response to the displayed indication being activated. In some implementations, the first application may be selected for use in opening and editing the content item based on information that is contained in the schema.

Figure 9:
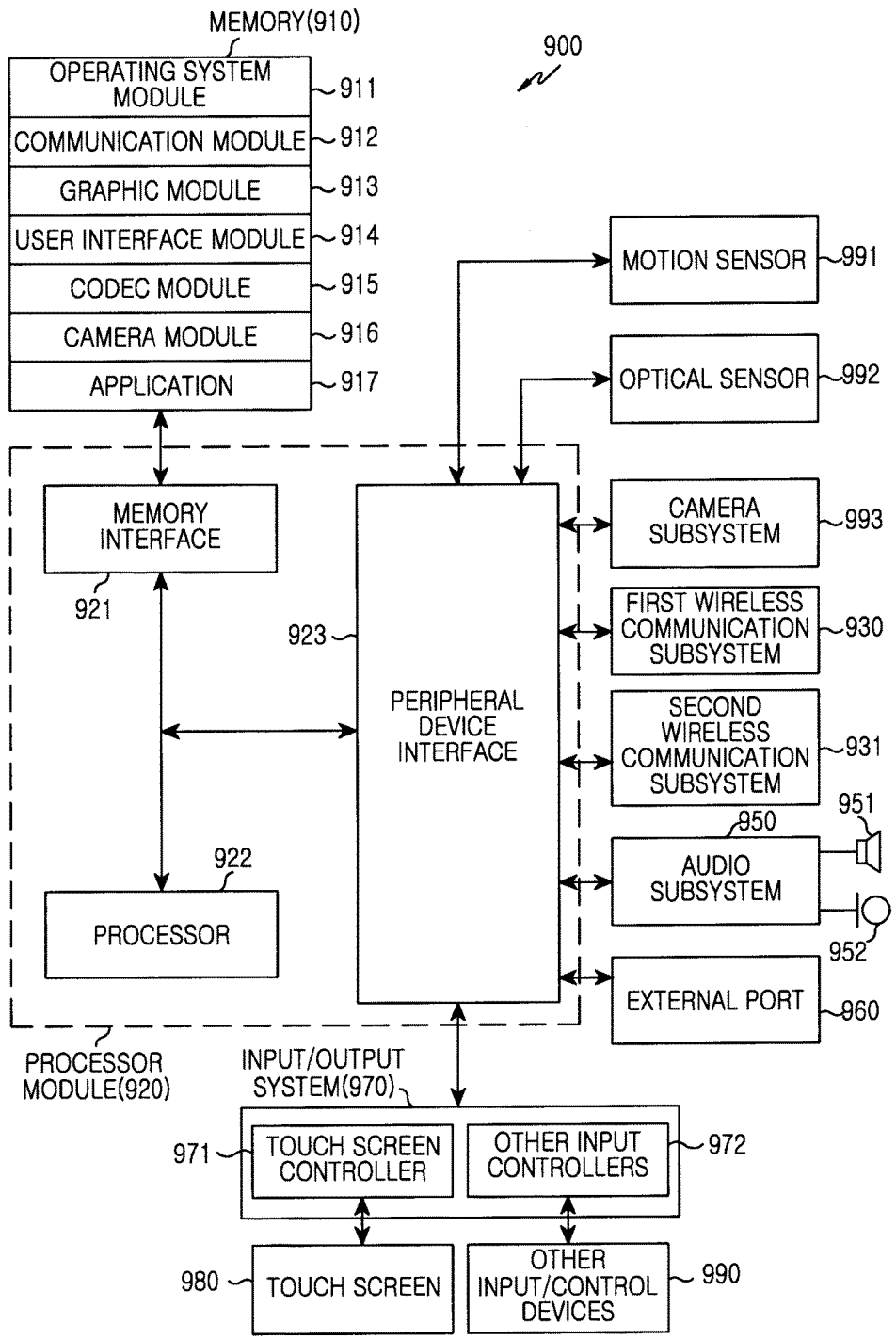
FIG. 9 is a block diagram illustrating a configuration of an electronic device according to aspects of the present disclosure.

FIG. 9 is a block diagram illustrating an example of a configuration of an electronic device 900 according to aspects of the present disclosure. Furthermore, the electronic device 900 may be a portable electronic device, and also may be a device such as a portable terminal, a mobile phone, a media player, a tablet computer, a handheld computer, or a Personal Digital Assistant (PDA). Additionally, the electronic device may be an arbitrary portable electronic device combining at least two functions among such devices.

The electronic device 900 may include a memory 910, a processor module 920, a first wireless communication subsystem 930, a second wireless communication subsystem 931, an external port 960, an audio subsystem 950, a speaker 951, a microphone 952, an input/output system 970, a touch screen 980, and other input/control devices 990. The memory 910 and the external port 960 may be provided in plurality.

The processor module 920 may include one or more of an ARM-based processor, an x86-based processor, a MIPS-based processor, an Application-Specific Integrated Circuit (ASIC), a Field-Programmable Gate Array (FPGA), and or any other suitable type of processing circuitry. Additionally, the processor module 920 may include a memory interface 921, at least one processor 922, and a peripheral interface 923. Although in the present example, the processor module 920 is depicted as a monolithic module, in other implementations, the processor module 920 may comprise a plurality of different modules. If necessary, the entire processor module 920 may be referred to as a processor.

In some implementations, the processor module 920 may perform one or more of the operations discussed with respect to one or more of FIGS. 1-8. For example, the processor 922 may include at least one data processor, image processor, or CODEC. The data process, the image processor, or the CODEC may be configured separately. Moreover, the processor may include several processors performing different functions. The peripheral device interface 923 may connect the input/output subsystem 970 of the electronic device 900 and several peripheral devices to the processor 922 and the memory 910 (through a memory interface).

Various components of the electronic device 900 may be coupled to each other by at least one communication bus (a reference number not shown) or a stream line (a reference number not shown).

The external port 960 may directly connect a portable electronic device (not shown) to another electronic device or may indirectly a portable electronic device (not shown) to another electronic device via a network (e.g., internet, internet, wireless LAN, etc.). The external port 960 is not limited to the above and may refer to a universal serial bus (USB) port or a FIREWIRE port.

A motion sensor 991 and a first optical sensor 992 are coupled to the peripheral device interface 923 so as to perform various functions. For example, the motion sensor 991 and the first optical sensor 992 are coupled to the peripheral device interface 923 so as to detect a motion of each electronic device and light from the outside. Besides that, other sensors such as a positioning system, a temperature sensor, or a biosensor may be connected to the peripheral interface 923 to perform related functions.

A camera subsystem 993 may perform a camera function such as picture and video clip recording.

The optical sensor 992 may use a charged coupled device (CCD) or a complementary metal-oxide semiconductor (CMOS) device.

A communication function is performed through at least one wireless communication subsystem 930 and 931. The wireless communication subsystems 930 and 931 may include a radio frequency receiver and transceiver and/or an optical (e.g., infrared) receiver and transceiver. The first communication subsystem 930 and the second communication subsystem 931 may be classified depending on a communication network communicating with the electronic device 900. For example, the communication network is not limited to the above, and may include a communication subsystem designed to operate through a Global System for Mobile Communication (GSM) network, Enhanced Data GSM Environment (EDGE) network, Code Division Multiple Access (CDMA) network, W-Code Division Multiple Access (W-CDMA) network, Long Term Evolution (LTE) network, Orthogonal Frequency Division Multiple Access (OFDMA) network, Wireless Fidelity (Wi-Fi) network, WiMax network, and/or Bluetooth network. The first wireless communication subsystem 930 and the second wireless communication subsystem 931 may be integrated to be one wireless communication subsystem.

The audio subsystem 950 may be coupled to a speaker 951 and a microphone 952 to be responsible for input and output of audio stream such as voice recognition, voice copy, digital recording, and phone functions. That is, the audio subsystem 950 communicates with a user through the speaker 951 and the microphone 952. The audio subsystem 950 receives data stream through the peripheral device interface 923 of the processor module 920 and converts the received data stream into an analog signal. The converted analog signal is delivered to the speaker 951. The speaker 951 converts the analog signal into audible sound wave and outputs it. The microphone 952 converts the sound wave delivered from person or other sound sources into an analog signal. The audio subsystem 950 receives the converted analog signal from the microphone 952. The audio subsystem 950 converts the received analog signal into audio data stream and transmits the converted audio data stream to the peripheral interface 923. The audio subsystem 950 may include an attachable and detachable earphone, headphone, or headset.

The input/output subsystem 970 may include a touch screen controller 971 and/or other input controllers 972. The touch screen controller 971 may be coupled to the touch screen 980. The touch screen 980 and the touch screen controller 971 are not limited to the above, and may detect a contact, movement, or stop through an arbitrary multi touch detection technology including other proximity sensor arrangements or other components in addition to capacitive, resistive, infrared and surface acoustic wave technologies for determining at least one contact point on the touch screen 980. The other input controllers 972 may be coupled to the other input/control devices 990. The other input/control devices 990 may include at least one button, rocker switch, thumb-wheel, dial, stick, and/or pointer device such as a stylus.

The touch screen 980 provides an input/output interface between the electronic device 900 and a user. That is, the touch screen 980 delivers a user's touch input to the electronic device 900. Additionally, the touch screen 980 is a medium displaying an output from the electronic device 900 to a user. That is, the touch screen 980 displays a visual output to a user. Such a visual output includes text, graphic, video, and combinations thereof.

The touch screen 980 may include various displays. For example, the touch screen 980 is not limited to the above, and may include liquid crystal display (LCD), Light Emitting Diode (LED), light emitting polymer display (LPD), Organic Light Emitting Diode (OLED), Active Matrix Organic Light Emitting Diode (AMOLED) or Flexible LED (FLED).

The memory 910 may be coupled to the memory interface 921. The memory 910 may include at least one magnetic disk storage device, high-speed random access memory and/or nonvolatile memory, and at least one optical storage device and/or flash memory (e.g., NAND and NOR).

The memory 910 stores software. The software component includes an operating system module 911, a communication module 912, a user interface module 914, an codec module 915, a camera module 916, and at least one application module 917. Additionally, the modules, e.g., the software components, may be expressed in a set of instructions and thus, may be referred to as an instruction set. The modules may be expressed in programs. The operating system module 911 (e.g., embedded operating systems such as WINDOWS, LINUX, Darwin, RTXC, UNIX, OS X, or VxWorks) includes various software components controlling general system operations. Controlling such general system operations means memory management and control, storage hardware (device) control and management, and power control and management, for example. Such operating system software may also serve to allow smooth communication between various hardware components (e.g., devices) and various software components (e.g., modules).

The communication module 912 may allow communication with other electronic devices such as computers, servers, and/or portable terminals through the wireless communication subsystems 930 and 931 or the external port 960. The graphic module 913 provides graphics on the touch screen 980 and includes various software components for display. The term "graphics" may include text, web page, icon, digital image, video, and animation.

The user interface module 914 may include various software components relating to a user interface. The user interface module 914 may specify how a state of a user interface is changed or under what condition the state of the user interface is changed.

The CODEC module 915 may include software components relating to encoding and decoding of a video file. The CODEC module 915 may include a video stream module such as an MPEG module and/or an H204 module. Additionally, the CODEC module 915 may include various CODEC modules for audio files such as AAA, AMR, and WMA. Additionally, the CODEC module 915 includes an instruction set corresponding to a method according to an aspect of the present disclosure.

The camera module 916 includes a camera related software component for performing camera related processes and functions.

The application module 915 may include browser, email, instant message, word processing, keyboard emulation, address book, touch list, widget, Digital Right Management (DRM), voice recognition, voice copy, position determining function, and location based service.

Additionally, the various functions of the electronic device described above may be executed through hardware including at least one stream processing and/or application specific integrated circuit (ASIC), and/or software, and/or combinations thereof.

It should be noted that the FIGS. 1-9 are presented as an example only. In some implementations, at least some of the steps depicted in FIGS. 4-8 may be performed concurrently, in a different order, or altogether omitted. Additionally or alternatively, in some implementations, at least one of the first electronic device and the second electronic may have a configuration that is identical or similar to the hardware configuration of the electronic device 900. Accordingly, in these implementations, some or all of the steps discussed with respect to FIGS. 4-8 may be performed by the processor module 920.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". As used throughout the disclosure, the term data structure may refer to a file, a protocol data unit (PDU) and/or any other suitable type of data structure.

While the disclosure has been shown and described with reference to certain preferred aspects thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method comprising:
    generating, by an electronic device, at least one content item renderable on a first application;
    executing a second application while the first application is still active;
    receiving a selection of at least one recipient for the at least one content item; and
    transmitting, to a server, the at least one content item with information on the at least one recipient able to receive the at least one content item by using the second application, to enable the server to transmit, based on the information, the at least one content item to an electronic device of the at least one recipient, wherein the information comprises a schema that includes a type tag identifying a type of the at least one content item, a file name tag identifying a file name of the at least one content item, a name tag identifying a third application executable on the electronic device of the at least one recipient to render the at least one content item, and an address tag identifying an address where the third application is available for download.

2. The method of claim 1, wherein the at least one content item comprises at least one of text, sound, image, and video.

3. The method of claim 1, wherein the second application is a messenger application.

4. A method by an electronic device comprising:
receiving, from a server, a content item renderable on a first application and data associated with the content item, the content item being received via a second application;
displaying, in the second application, an indication that the content item is received, the indication being displayed based on the data;
identifying the first application that is capable of opening the content item based on the data;
executing the first application and opening the content item with the first application;
editing the content item by using the first application;
receiving a selection of at least one recipient for the edited content item; and
transmitting, to the server, the edited content item with information on the at least one recipient able to receive the edited content item by using the second application, to enable the server to transmit, based on the information, the edited content item to an electronic device of the at least one recipient,
wherein the information comprises a schema that includes a type tag identifying a type of the edited content item, a file name tag identifying a file name of the edited content item, a name tag identifying a third application executable on the electronic device of the at least one recipient to render the edited content item, and an address tag identifying an address where the third application is available for download.

5. The method of claim 4, wherein the second application is a message application.

6. The method of claim 4, wherein the content item comprises at least one of text, sound, image, and video.

7. The method of claim 4, wherein the data associated with the content item identifies at least one of a name of the first application and a name of the content item.

8. An electronic device comprising a communication module and a processor configured to:
generate at least one content item by executing a first application;
execute a second application while the first application is still active; and
receive a selection of at least one recipient for the at least one content item; and
transmit, to a server, the at least one content item with information on the at least one recipient able to receive the at least one content item by using the second application, to enable the server to transmit, based on the information, the at least one content item to an electronic device of the at least one recipient,
wherein the information comprises a schema that includes a type tag identifying a type of the at least one content item, a file name tag identifying a file name of the at least one content item, a name tag identifying a third application executable on the electronic device of the at least one recipient to render the at least one content item, and an address tag identifying an address where the third application is available for download.

9. The device of claim 8, wherein the at least one content item comprises at least one of text, sound, image, and video.

10. The device of claim 8, wherein the second application is a messenger application.

11. An electronic device comprising a display unit and a processor configured to:
receive, from a server, a content item renderable on a first application and data associated with the content item, the content item being received via a second application;
display, in the second application, an indication that the content item is received, the indication being displayed based on the data;
identify a first application that is capable of opening the content item based on the data;
execute the first application to open the content item with the first application;
edit the content item by using the first application;
receive a selection of at least one recipient for the edited content item; and
transmit, to a server, the edited content item with information on the at least one recipient able to receive the edited content item by using the second application, to enable the server to transmit, based on the information, the edited content item to an electronic device of the at least one recipient,
wherein the information comprises a schema that includes a type tag identifying a type of the edited content item, a file name tag identifying a file name of the edited content item, a name tag identifying a third application executable on the electronic device of the at least one recipient to render the edited content item, and an address tag identifying an address where the third application is available for download.

12. The device of claim 11, wherein the second application is a messenger application.

13. The device of claim 11, wherein the content item comprises at least one of text, sound, image, and video.

14. The device of claim 11, wherein the data associated with the content item identifies at least one of a name of the first application and a name of the content item.

* * * * *